United States Patent [19]

Nicolas

[11] Patent Number: 4,680,966
[45] Date of Patent: Jul. 21, 1987

[54] APPARATUS FOR EXAMINING AN OBJECT BY ULTRASONIC ECHOGRAPHY

[75] Inventor: Jean-Marie Nicolas, Saint-Maur, France

[73] Assignee: U.S. Philips Corporation, New York, N.Y.

[21] Appl. No.: 743,222

[22] Filed: Jun. 10, 1985

[30] Foreign Application Priority Data

Jun. 15, 1984 [FR] France .................................. 84 09411

[51] Int. Cl.⁴ .......................................... G01N 29/00
[52] U.S. Cl. ........................................ 73/597; 73/629
[58] Field of Search ................... 73/597, 598, 629, 628

[56] References Cited

U.S. PATENT DOCUMENTS 4,395,909 8/1983 Steinberg et al. ...................... 73/606
4,566,459 1/1986 Umemura et al. ..................... 73/597
4,570,486 2/1986 Volkmann .............................. 73/597

Primary Examiner—Howard A. Birmiel
Attorney, Agent, or Firm—Jack E. Haken

[57] ABSTRACT

An apparatus for examining objects by ultrasonic echography comprising an ultrasonic transmitting transducer (10) and an ultrasonic receiving transducer (20), with which are associated a transmitter stage (30), a receiver stage (40) constituted by a channel (100) for processing the echo signals reflected to the receiving transducer by the obstacles they meet in the said region and a storage and/or visualization stage (60), characterized in that the transmitting transducer (10) is at the same time a receiver and in that the receiver stage (40) also comprises a channel (200) for processing the output signals of the said transmitting/receiving transducer (10) thus formed and a subtraction device (500), whose output is connected to a first input (560) of the storage and/or visualization stage and whose two inputs receive the output signals of the said channels (100) and (200) representative of the real and theoretical travelling times, respectively, between the transducers.

10 Claims, 3 Drawing Figures

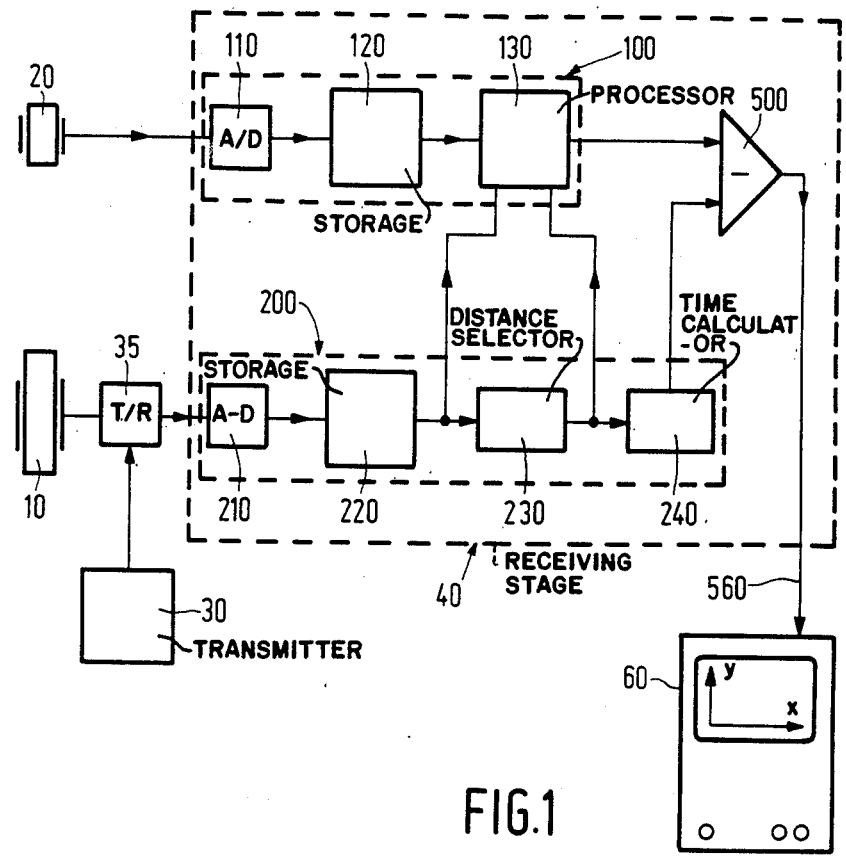
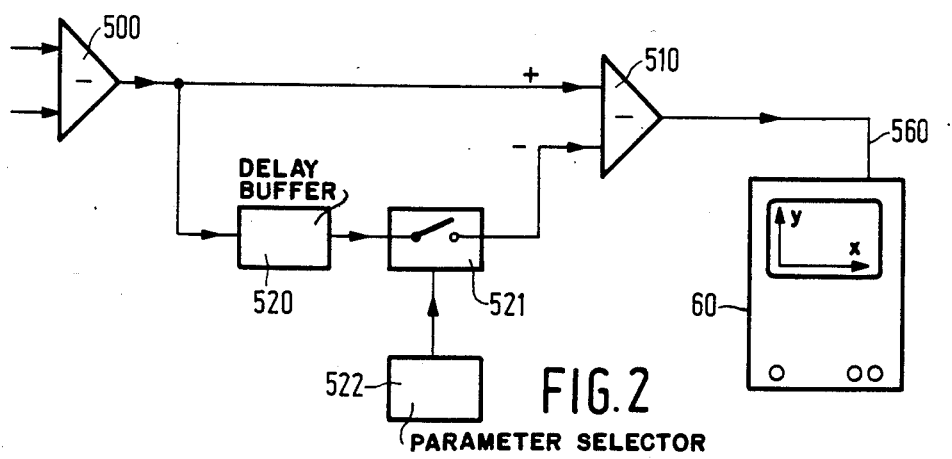

APPARATUS FOR EXAMINING AN OBJECT BY ULTRASONIC ECHOGRAPHY

FIELD OF THE INVENTION

The invention relates to an apparatus for examining an object by ultrasonic echography of the type which comprises at least one ultrasonic transmitting transducer and at least one ultrasonic receiving transducer with which are associated a transmitter stage for the repeated transmission of ultrasonic waves to a region to be examined, a receiver stage which includes a channel for processing echo signals which are reflected to the receiving transducer by the obstacles in the region and a stage for storing and/or visualizing the information supplied by the receiving stage.

The invention is useful in the medical field for examining biological tissues and diagnosis as well as for non-destructive testing.

DESCRIPTION OF THE PRIOR ART

U.S. Pat. No. 4,395,909 discloses apparatus for examining media by ultrasonic echography which comprises transmitting transducers, receiving transducers, a transmitter stage composed of a circuit for exciting the transmitting transducer and a timing circuit; a receiver stage in the form of a processing channel composed of an analog-to-digital converter, a processing circuit and a control circuit; and a stage for displaying information supplied by the receiving stage.

In this, prior art, apparatus, information received by the transducers indicate ultrasonic speed variations, density variations, and attenuation variations. The apparatus permits utilizing the said received information to produce synthetic images of high quality by using a reference situated in the ultrasonic examination field.

SUMMARY OF THE INVENTION

The invention is an improved apparatus for measuring and displaying the local speed of ultrasonic waves in a region of an object being examined. The apparatus comprises a first transducer which is used both to transmit ultrasonic waves into the media and to receive echoes of those waves from the region undergoing examination. A second transducer also receives the echos. The apparatus further comprises a receiver with two channels which respectively produce signals representative of the real and theoretical traveling times of ultrasonic waves between the transducers. The difference between the signals is utilized as an output to, for example, produce an A or B mode display.

An object of the invention is to provide novel apparatus for examining media by ultrasonic echography in which information representative of traveling times of ultrasonic waves is exclusively utilized to ensure that a precise analysis of the examined media is obtained.

DESCRIPTION OF THE DRAWINGS

In order that the invention may be readily carried into effect, it will now be described more fully, by way of example, with reference to the accompanying drawings, in which:

FIG. 1 is a first embodiment of the invention which comprises a single receiving transducer;

FIG. 2 is a differential circuit; and

DESCRIPTION OF PREFERRED EMBODIMENTS

Figure 3:
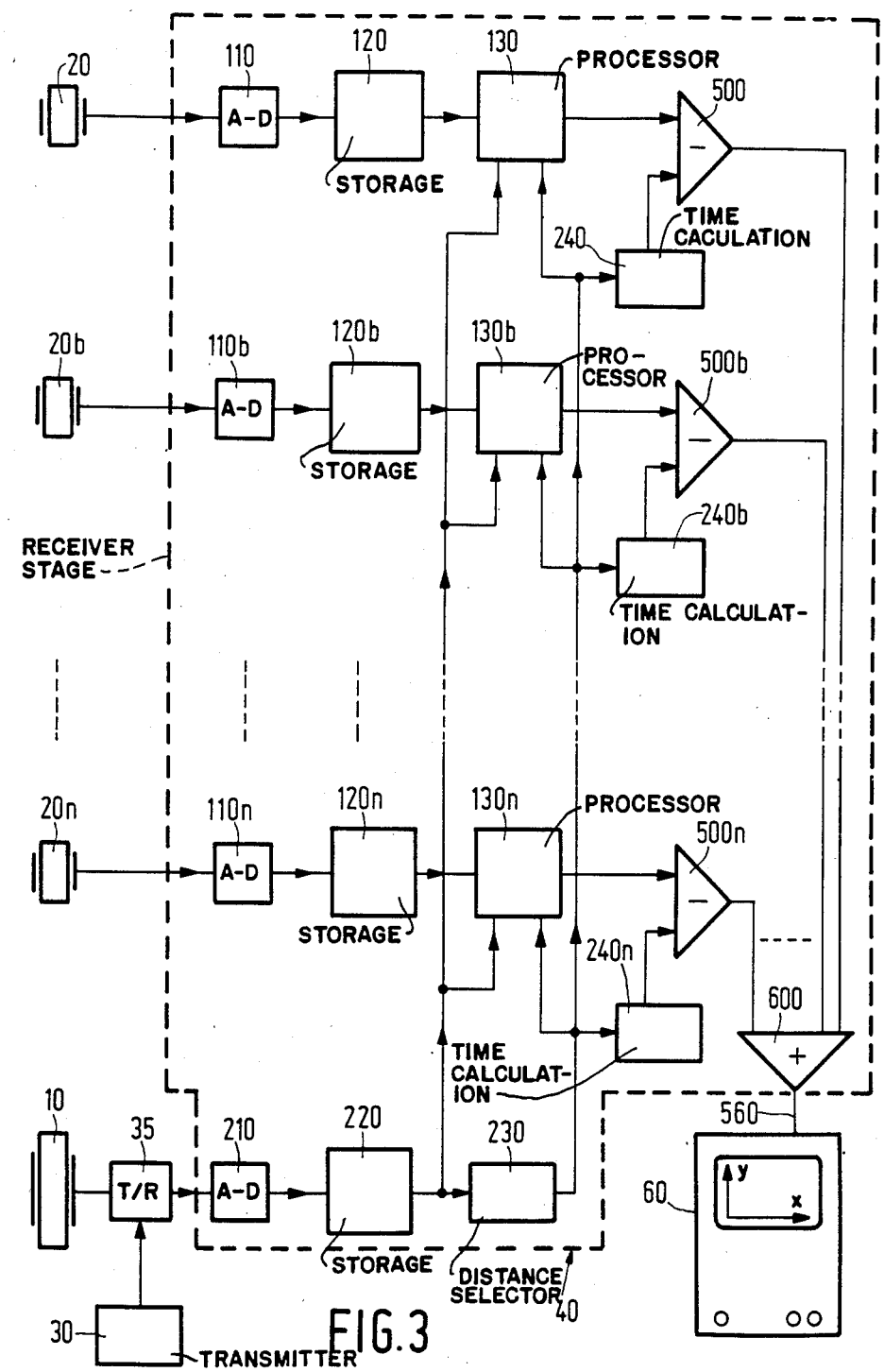
FIG. 3 shows another embodiment of the invention which comprises n receiving transducers.

In FIG. 1, the apparatus comprises a first ultrasonic transducer 10 and a second ultrasonic receiving transducer 20, whose relative positions are accurately defined and known. A transmitting stage 30 is connected to the first transducer 10 for the repeated transmission of ultrasonic waves into a region to be examined. A receiving stage 40 is connected to the second transducer 20 and includes a first channel 100 for processing echo signals reflected to the second transducer.

The first transducer 10 is also utilized as a receiver (it will be designated hereinafter as the "transmitting-/receiving transducer" 10). A T-R interface circuit is connected between the transducer 10 and the receiver stage 40 to prevent its being overloaded by the transmitting stage 30. The receiver 40 also comprises a second channel 200 for processing the output signals from the transducer 10. The first processing channel 100 comprises (in series arrangement) a first analog-to-digital converter 110, a first storage circuit 120, and a first processing circuit 130. The second channel 200 comprises the series arrangement of a second analog-to-digital converter circuit 210, a second storage circuit 220, a distance selection circuit 230 (which defines the observation depth) and a circuit 240 for calculating the travelling time. In a preferred embodiment the converter 110 and the circuit 210 operate at a frequency of 20 MHz. The output signals of the storage circuit 220 and of the distance selection circuit 230 are transmitted to the first processing circuit 130. A subtractor 500 is connected to the outputs of the channels 100 and 200. The output of the subtractor 500 is connected to an input 560 of the storage and/or visualization stage 60. The two inputs of the subtractor 500 receive the output signals of the channels 100 and 200 which are representative of the real and theoretical travelling times, respectively, between the two transducers.

On the basis of the signals stored in the second storage circuit 220, the distance selection circuit 230 selects a point-shaped target—by specifying corresponding travelling time between this target and the transmitting-/receiving transducer 10—on the axis of propagation of the ultrasonic waves. The circuit 240 then calculates the corresponding average depth of the target on the basis of a hypothesis of a constant ultrasonic speed and derives therefrom on the basis of the same hypothesis the theoretical travelling time between the transmitting-/receiving transducer 10, the selected target and the receiving transducer 20. Processing circuit 130 correlates the information in storage circuits 120 and 220 and selects those echo signals which were received by the transducer 20 and stored in storage 120 which originate from the same target selected by the circuit 230 in the channel 200. This selection is enabled by the existence of a connection between the output of the circuit 230 and circuit 130. The processing circuit 130 then calculates the real travelling time between the transmitting-/receiving transducer 10, the selected target and the receiving transducer 20. On the basis of the output signals of the channels 100 and 200 the subtraction device 500 then supplies a signal representative of the difference between these theoretical and real travelling times. This travelling-time difference signal, which is indicative of the transversal variations of the ultrasonic speed in the examined object, is connected to the input 560 of the storage and/or visualization stage, which either stores the measurement results for the line thus analyzed or of displays these results in the A mode. If the apparatus is provided with a scanning control, it is then possible to realize an acquisition of results in a linewise manner and to display these results in the B mode on a screen, whose scanning according to X corresponds to, for example, the depth of examination and whose scanning according to Y corresponds, for example, to the displacement of the apparatus transverse to the direction of examination.

It is possible to arrange a conventional processing channel in parallel with the above-described apparatus, either at the input of the analog-to-digital converter circuit 210, whose output is connected to another input of the storage and/or visualization stage 60 or at the output of the circuit 210.

In the embodiment described, the measurement result for each selected point-shaped target is a travelling time difference. In an alternate embodiment, means are arranged by which the derivative of the difference is obtained. More precisely (cf. FIG. 2), this second embodiment further comprises an additional subtraction circuit 510 which receives the output signal of the subtraction device 500, at a first input of a given polarity, in this case, for example, positive polarity, and at a second input of opposite polarity receives the same output signal of the subtraction device 500, which has passed through a buffer storage 520 which delays the signal by at least one clock pulse. The difference signal thus obtained is the derivative of the travelling time difference and is supplied to the input 560 of the storage and/or visualization stage 60. An improvement of this structure leads to a third embodiment (which is shown in FIG. 2) which further consists of an interruptor 521 controlled by a parameter selection circuit 522. The presence of these two supplementary elements selectively renders the buffer storage 520 inoperative and hence switches the output between travelling time differences or derivatives of such differences.

In principle, the transmitting/receiving transducer 10 and receiving transducer 20, are identical. Actually, it may be advantageous to use a transmitting/receiving transducer 10, whose resonant frequency is higher than that of the receiving transducer 20. Objects examined by the ultrasonic waves have a low-pass filter effect, so that an optimum operation of the receiving transducer is thus obtained if the difference between the said resonance frequencies is suitably chosen. It is also advantageous to use a transmitting/receiving transducer 10 which is focussed because this choice then permits exactly selecting the point-shaped targets situated on the main axis of propagation in order to avoid parallax errors. Synthetic focusing can also be obtained for the transmission, which is especially interesting for non-destructive examination of materials, The receiving transducer 20 is then in fact also a transmitter and is connected to the transmitter stage 30 through a delay circuit which subjects this transducer to a variable delay.

The invention can generally be used in the case in which several receiving transducers are symmetrically distributed around the transmitting/receiving transducer 10. This embodiment is shown in FIG. 3. It comprises n identical receiving transducers 20, 20$b$, 20$c$, ... 20$i$, ... 20$n$, n identical channels 100, 100$b$, 100$c$, ... 100$i$, ... 100$n$ for processing echo signals reflected to these receiving transducers by the obstacles they meet in the region to be examined and n identical subtraction devices 500, 500$b$, 500$c$, ... 500$i$, ... 500$n$. The first inputs of these n subtraction devices receive the output signal of the n corresponding channels 100 to 100$n$; their second inputs receive the output signal of n circuits 240, 240$b$, 240$c$, ... 240$i$, ... 240$n$ for calculating the travelling time arranged in parallel at the output of the distance selection circuit 230 of the processing channel 200. An adder 600 produces the sum of the output signals of these subtraction devices, which is then transmitted to the input 560 of the stage 60.

As described above, it is possible and advantageous to provide the apparatus with n subtraction circuits, with n buffer storages, with n interruptors and with n parameter selection circuits (as described in FIG. 2) for working according to choice with travelling time differences or with derivatives of such differences. In either case, the use of several receiving transducers (and corresponding processing channels) permits averaging to suppress disturbances that may be produced by the anisotropy of the medium. It is also possible to provide an operator device using a more complex estimator, for example an operator device evaluating the derivative of the sum of the travelling time differences in place of the adder 600. A circuit for selecting one or several of the processing channels 100 to 100$n$ may be connected ahead of the adder 600, so that by successive selections speed variations can be compared in different directions.

Finally, the synthetic focusing for the transmission provided in the case of a single receiving transducer can also be used in the case in which n receiving transducers 20, 20$b$, 20$c$, ... 20$n$ are present. These transducers are then also transmitters and the n transmitter/receiving transducers thus formed and the transmitting/receiving transducers 10 are connected to the transmitter stage 30 through (n+1) delay circuits which produce synthetic focusing for an average depth on the axis of the transmitting/receiving transducer 10. Interface circuits (n+1 in number) can be provided (as described above) in order to avoid the dazzling of the receiver stage by the transmitter stage.

What is claimed is:

1. In apparatus for examining an object by ultrasonic echography which comprises:
   a first ultrasonic transducer;
   a second ultrasonic transducer;
   transmitter means connected to the first transducer which cause repeated transmission of ultrasonic waves into a region of the object to be examined;
   receiver means which include first channel means connected to process echo signals which are reflected to the second transducer from the region; and
   means connected for storing and/or visualizing information supplied by the receiver means, the improvement wherein:
   the first transducer also functions as a receiving transducer and the receiver means further comprise second channel means connected to receive output signals from the first transducer which functions to compute a theoretical traveling time for ultrasonic signals which propagate from the first transducer into the region and are reflected to the second transducer;
   wherein the first channel means further comprises means which calculate the actual traveling time of signals which propagate from the first transducer to the second transducer; and further comprising a first subtractor having inputs connected to receive the outputs of the first channel means and the second channel means respectively and having an output connected to the means for storing and/or visualizing information supplied by the receiver means.

2. The improvement of claim 1 wherein the first channel means comprise, in functional series arrangement, first analog-to-digital conversion means, first storage means, and first processing means; and the second channel means comprise, in functional series arrangement, second analog-to-digital converter means, second storage means, distance selection means and means for calculating traveling time; the output signals of the second storage storage means and of the distance selection means being connected to the input of the first processing means.

3. The apparatus of claim 1 or 2 further comprising means for calculating the time derivative of the difference between the output of the first channel means and the output of the second channel means.

4. The improvement of claim 3 wherein the storage and/or visualization means may be selectively connected to receive as an input either the output of the first subtractor or the output of the means for calculating the time derivative.

5. The improvement of claims 4 further comprising $n-1$ additional receiving transducers and wherein the receiver means further comprises $n-1$ additional channel means, each of which is identical to the first channel means, connected to respectively calculate the difference between the output of each of the additional channel means and the output of the second channel means, and combining means connected to combine the outputs of the subtractors and to furnish the combined outputs as an input to the storage and/or visualization means.

6. The improvement of claim 3 further comprising $n-1$ additional receiving transducers and wherein the receiver means further comprises $n-1$ additional channel means, each of which is identical to the first channel means, connected to respectively calculate the difference between the output of each of the additional channel means and the output of the second channel means, and combining means connected to combine the outputs of the subtractors and to furnish the combined outputs as an input to the storage and/or visualization means.

7. The improvement of claim 1 wherein the first transducer has a resonant frequency which is higher than the resonant frequency of the second transducer.

8. The improvement of claims 1, 2, or 7 further comprising $n-1$ additional receiving transducers and wherein the receiver means further comprises $n-1$ additional channel means, each of which is identical to the first channel means, connected to respectively calculate the difference between the output of each of the additional channel means and the output of the second channel means, and combining means connected to combine the outputs of the subtractors and to furnish the combined outputs as an input to the storage and/or visualization means.

9. The improvement of claim 7 wherein the combining means comprises an adder which sums the outputs of the subtractors.

10. The improvement of claim 1 wherein the first transducer is a focused transducer.

* * * * *